US012601588B2

(12) United States Patent
Wentink et al.

(10) Patent No.: US 12,601,588 B2
(45) Date of Patent: Apr. 14, 2026

(54) DEVICE AND METHOD FOR DETERMINING THE THREE-DIMENSIONAL GEOMETRY OF AN INDIVIDUAL OBJECT

(71) Applicant: TWINport360 Holding B.V., Varsseveld (NL)

(72) Inventors: Raymond Wentink, Marienvelde (NL); Roy Joling, Hengelo (NL)

(73) Assignee: TWINPORT360 HOLDING B.V., Varsseveld (NL)

( * ) Notice: Subject to any disclaimer, the term of this patent is extended or adjusted under 35 U.S.C. 154(b) by 219 days.

(21) Appl. No.: 18/008,470

(22) PCT Filed: Jun. 18, 2021

(86) PCT No.: PCT/NL2021/050383
§ 371 (c)(1),
(2) Date: Dec. 6, 2022

(87) PCT Pub. No.: WO2021/256930
PCT Pub. Date: Dec. 23, 2021

(65) Prior Publication Data
US 2023/0204349 A1      Jun. 29, 2023

(30) Foreign Application Priority Data
Jun. 18, 2020    (NL) ...................................... 2025856

(51) Int. Cl.
*G01B 11/25*          (2006.01)

(52) U.S. Cl.
CPC ................................. *G01B 11/2522* (2013.01)

(58) Field of Classification Search
CPC ................................................ G01B 11/2522
See application file for complete search history.

(56) References Cited

U.S. PATENT DOCUMENTS

| | | | | |
|---|---|---|---|---|
| 5,991,041 A | * | 11/1999 | Woodworth | ........... G01B 11/04 |
| | | | | 356/613 |
| 2010/0260378 A1 | * | 10/2010 | Noy | ......................... G06T 7/12 |
| | | | | 382/103 |

(Continued)

FOREIGN PATENT DOCUMENTS

| | | |
|---|---|---|
| CN | 107764205 A | 5/2020 |
| EP | 3327611 A1 | 5/2018 |

(Continued)

OTHER PUBLICATIONS

International Search Report and Written Opinion, dated Aug. 31, 2021, for Application No. PCT/NL2021/050383, (15 pages).

*Primary Examiner* — Michelle M Iacoletti
*Assistant Examiner* — Maher Yazback
(74) *Attorney, Agent, or Firm* — KDW Firm PLLC

(57) ABSTRACT

A device for determining the three-dimensional geometry of an individual object includes a supplier, a line projection, an image capturing system, and a processing unit connected to the first image capturing system for receiving the first signal. The processing unit is configured to
determine, for each image from the image capturing system, a two-dimensional representation of a slice of the object, and
determine, using the representation of each slice, a three-dimensional representation of the object. A method of determining a three-dimensional representation of an individual object includes the aforementioned steps performed by the processing unit.

21 Claims, 8 Drawing Sheets

(56) References Cited

U.S. PATENT DOCUMENTS

| | | | |
|---|---|---|---|
| 2013/0076857 A1 | 3/2013 | Kurashige et al. | |
| 2015/0039121 A1* | 2/2015 | Hermary | G05B 19/4097 |
| | | | 700/163 |
| 2015/0049345 A1 | 2/2015 | Miyagawa | |
| 2015/0054918 A1* | 2/2015 | Lee | H04N 13/254 |
| | | | 348/46 |
| 2015/0109418 A1* | 4/2015 | Lin | G06T 7/80 |
| | | | 348/47 |
| 2015/0160005 A1* | 6/2015 | Iwai | G06T 7/62 |
| | | | 348/46 |
| 2017/0374342 A1 | 12/2017 | Zhao et al. | |
| 2018/0035098 A1* | 2/2018 | Peeters | H04N 13/243 |
| 2019/0353477 A1 | 11/2019 | Zheng | |
| 2021/0025830 A1* | 1/2021 | Rahn | G01N 33/383 |
| 2022/0178838 A1* | 6/2022 | Orzol | G06T 7/75 |
| 2023/0168080 A1* | 6/2023 | Köster | G01B 11/002 |
| | | | 356/601 |

FOREIGN PATENT DOCUMENTS

| | | | | |
|---|---|---|---|---|
| EP | 3467431 A1 * | 4/2019 | | G01B 11/25 |
| EP | 3822579 A1 * | 5/2021 | | G01B 11/245 |
| JP | S63-178219 * | 11/1988 | | B65G 11/02 |
| JP | 2001255125 A | 9/2001 | | |
| WO | WO-2010040219 A1 * | 4/2010 | | A63B 24/0021 |
| WO | 2014040486 A1 | 3/2014 | | |
| WO | 2018130421 A1 | 7/2018 | | |

* cited by examiner

50

53    54    52

52

51

55

60

DEVICE AND METHOD FOR DETERMINING THE THREE-DIMENSIONAL GEOMETRY OF AN INDIVIDUAL OBJECT

This application is a national stage filing under 35 U.S.C. 371 of pending International Application No. PCT/NL2021/050383, filed Jun. 18, 2021, which claims priority to Netherlands Patent Application No. 2025856, filed Jun. 18, 2020, the entirety of which applications are incorporated by reference herein.

The invention relates to a device for determining the three-dimensional geometry of an individual object.

Such a device may be used in many applications, in particular those including handling of individual objects such as crops, in particular root crops such as potatoes, or parcels. In these cases, it is often desirable to have a three-dimensional representation of the individual object for instance for determine how to further process the object.

In the case of crops, the three-dimensional geometry may determine certain qualities of the crop. As an example, the three-dimensional geometry of a potato defines its appeal to potential buyers such as consumers or producers of food products such as French fries. Thus, a representation of the three-dimensional geometry of the crop can be used to determine e.g. its qualities and therefore ultimately its price. Moreover, the representation of the three-dimensional geometry can be used in a breeding process to select crops having likable traits.

From the art it is known to sample relatively large amount of crops, and to determine certain characteristics for crops in the sample, in order to determine an estimate for said traits representative for said amount of crops. The sample is analyzed by lab workers who for instance measure, weigh, and visually inspect the sampled crops. Although currently serving to at least some satisfaction, this method is time consuming and costly, may be inaccurate on an individual basis, and is most definitely inaccurate due to the limited sample size.

It is therefore an object of the invention to provide a device capable of determining the three-dimensional geometry of an individual object.

The object is achieved by a device for determining the three-dimensional geometry of an individual object, the device comprising a supplier configured to individually supply the object and to move it along a trajectory through a predetermined space, a line projection system configured to project a line along at least one predetermined plane, wherein the at least one plane intersects the trajectory in said space, so that when the object is at a position along the trajectory at which at least part of the object intersects the at least one plane, a contour of a slice of the object co-planar to the at least one plane is at least partly illuminated by the line, a first image capturing system configured to repeatedly capture first images in said space as the object moves through the at least one plane, the first images thereby including at least part of the illuminated contour, and for providing a first signal corresponding to the first images, a processing unit connected to the first image capturing system for receiving the first signal, wherein the processing unit is configured to:

- determine, for each first image, a two-dimensional representation of the slice based on said first signal and geometry information relating to the at least one plane; and
- determine, using the representation of each slice, a three-dimensional representation of the object.

Such a device can be used to determine a three-dimensional representation of the object, which could be a root crop such as a potato, relatively accurately. In the case of the object being a potato, the three-dimensional representation of the potato can be used in e.g. determining its volume. Combined with a value representing the potato's weight, the density of potato may be determined. The density may give an indication for the amount of starch in the potato, which determines to at least some extent its price and suitability for certain markets. Moreover, the three-dimensional representation can be used to determine whether the potato has certain desirable traits. As a non-limitative example, producers of French fries generally prefer potatoes of generally cubic or cuboid shape, so that they can be cut into French fries with relatively little losses. Thus, using the three-dimensional representation a potato's suitability for being cut into French fries may be determined. The three-dimensional representation may also be used to determine how many French fries can be cut from a potato, and to calculate the losses associated with cutting the potato into French fries. The suitability may then be used in a breeding process to select crops with favorable traits to breed further, or when selling or buying crops for determining their price. The three-dimensional representation can be used to determine for instance the roundness of the potato, as it is common perception in the potato consumer market that consumers prefer potatoes having a particular shape, which is often described as somewhat egg-like and/or spherical. Again, determining the three-dimensional representation of individual crops can be used to determine price or suitability for further breeding.

By individually treating each object, the device may be able to particularly accurately determine the three-dimensional geometry of said object. In particular, when the three-dimensional representation is used to determine a value corresponding to a volume of the object, a deviation of 1% or less from a true volume of the object may be achievable. Achieving accuracies in this range has, to the best of the applicant's knowledge, been impossible or impractical so far.

The increased accuracy of determining the three-dimensional geometry may be used, for instance in the case of a potato, for determining the amount of dents the potato has. Dents, sometimes referred to as potato eyes, may be locations where new stems form if the potato were planted. The amount of dents is particularly interesting since it determines the potatoes suitability for sale and/or planting and/or further processing and/or breeding, additionally or alternatively, the amount of dents may influence the potato's value.

The at least one plane may consist of exactly one plane.

The geometry information may be a definition of the at least one plane, and may for instance include a definition of a normal to the at least one plane, or a parametric representation of the at least one plane. The skilled person appreciates that the at least one plane defines a relation between three coordinates. Combined with the first images, said relation allows the construction of a two-dimensional representation of each slice in three-dimensional space. Two-dimensional herein is used to indicate that the slice is largely planar, i.e. flat, however it is understood that the slice in real life has a certain thickness and would thus be a three-dimensional object itself. The at least one plane may be roughly or substantially perpendicular to the trajectory at a point in which the at least one plane and the trajectory intersect. The at least one plane may further or alternatively be a vertical plane.

Throughout this application, line projection systems and line projectors are to be understood as a device which produces a plane of light. When an object is placed in said plane of light, the object is illuminated along a line over its contour. Accordingly, said systems and projectors are referred to as line projection systems or line projectors respectively. A line projector may for instance comprise a scanning laser, which produces a beam of light moving back and forth through the plane relatively quickly so as to create the appearance of a plane. Alternatively, a laser or any other light source may be used together with for instance filters, lenses, shaped apertures and reflectors to create a plane of light, to ultimately project a line onto the object.

The supplier may be configured to move the object along the trajectory in free flight, e.g. via throwing, dropping, launching or the like. Free flight may herein be understood as that no external force is applied to the object as it moves along the trajectory. Thus, the supplier may be configured to release the object at a release point of the supplier. The trajectory may thus start at the release point, continue through the at least one plane, and end on the other side thereof. In other words, the supplier is configured to move the object along a free flight trajectory. The trajectory may start at and extend from the supplier.

An advantage of the free flight trajectory is that the object can be seen from all sides at the same time. Accordingly, it becomes possible to place camera's around the trajectory and to see all parts of the object in one pass through the at least one plane.

The specific set-up of cameras explained below helps in achieving this purpose. However it is already briefly stated that three cameras before, and three cameras after the at least one plane enable the device described herein to view an object (almost) completely.

In an embodiment of the device according to the invention, the device further includes a velocity sensor for sensing a velocity of the object as it passes through the at least one plane, configured to provide a second signal corresponding to the velocity, wherein the processing unit is connected to the velocity sensor for receiving the second signal, and wherein the processing unit is further configured to determine the two-dimensional representation of the slice and/or the three-dimensional representation of the object using the second signal.

Using the velocity sensor giving the second signal, it may be easier to determine the three-dimensional representation of the object from multiple two-dimensional representations. The second signal, since it includes information on the velocity of the object, allows to calculate a mutual position of two two-dimensional representations, thereby allowing to merge the two multiple two-dimensional representations together. Additionally or alternatively, using the velocity sensor, the velocity of the object may be determined relatively accurately. As such, the three-dimensional representation, which is in fact based in part on the velocity of the object, may also be determined relatively accurately.

It is noted that measuring the velocity of the object may take place as it passes through the at least one plane, i.e. while the object is in free flight. Accordingly, any velocity measurement techniques based on e.g. measuring the speed of a conveyor belt or the like, is inapplicable as there is no such belt. In free flight the velocity of the object may change. Thus, the velocity of the object is not necessarily the same as that of the supplier when it was released. It may therefore be especially advantageous to sense the instantaneous velocity of the object.

The determined velocity may be a translational velocity, a rotational velocity, or both.

The use of a velocity sensor can be particularly useful through determining the velocity repeatedly as the object passes through the at least one plane. This allows for accounting for changes in the velocity of the object as it passes through the at least one plane. In particular, the velocity may be determined for every first image or for every few first images.

Accordingly, the velocity sensor may be configured to determine an instantaneous velocity of the individual object, for instance while it is in free flight.

The velocity sensor may comprise a second image capturing system for repeatedly capturing second images of the object as it moves through the at least one plane, and for providing the second signal, the second signal corresponding to the second images, wherein the processing unit is configured to:

determine, using the second signal corresponding to at least two second images, a change in position along the trajectory of the object between times at which the at least two second images were captured; and determine, using the change in position, a value corresponding to the velocity of the object.

Using a second image capturing system may allow deriving information on translational and rotational velocity of the object. Additionally or alternatively, using a second image capturing system allows to at the same time determine other characteristics of the object using the second images. For instance, the second images may be used as an input to a computer program for registering visual characteristics of the object.

It is herein noted that in principle it is also possible to determine the velocity using the first image capturing system, the first images taking the place of the second images in the description above.

Having the separate second image capturing system however allows configuring the two image capturing systems differently. In particular, the first image system could be configured specifically to capture the illuminated contour, for instance by using one or more black-and-white or monochrome cameras, whereas the second image system could be configured to capture color or multi-spectral images. Accordingly, the processing of image data from the two differently configured image capturing systems may be relatively easy and/or require less computational power and/or produce more accurate results.

To facilitate capturing second images suitable for processing, the device may further comprise a front light and/or a backlight for illuminating the object from a front or back side as seen from the second image capturing system respectively.

The use of a front light may in particular allow capturing at least one color of the object. The use of a backlight may make it particularly easy to process the second images in order to determine the velocity, as a contour may be more easily detectably in presence of a backlight.

The second image capturing system may comprise a first camera for capturing the second images, the first camera having a first view axis, wherein the first camera is arranged such that:

the first view axis is substantially co-planar with or parallel to the at least one plane.

Having the first view axis substantially co-planar with or parallel to the at least one plane may allow to particularly accurately determine a velocity substantially normal to the at least one plane. Said velocity may then be used to particularly accurately determine a three-dimensional representation from two-dimensional representations of multiple slices.

When the second image capturing system comprises multiple cameras, multiple backlights and/or front lights may be used, for instance one backlight and/or front light for each camera.

When the at least one plane comprises more than one plane, the first view axis may be co-planer with at least one of said more than one plane.

The first view axis may be substantially horizontal. Accordingly, the first camera may be used to determine relatively easily and/or accurately a vertical component of the translational velocity.

The second image capturing system may comprise a second camera for capturing the second images, the second camera having a second view axis, wherein the second camera is arranged such that:

the second view axis is substantially co-planar with or parallel to the at least one plane; and the second view axis is at a non-zero angle with respect to the first view axis.

The second view axis being at a non-zero angle with respect to the first view axis allows using the second camera to determine velocity components that may be difficult or impossible to determine from merely the first camera. In particular, using images from the first camera it may be difficult or impossible to determine a translational velocity component parallel to the first view axis, and/or it may be difficult or impossible to determine a rotational velocity component around axes perpendicular to the first view axis. By using the second camera having the second view axis at an angle with the first view axes, at least some of the components may be determined, or may be determined more easily and/or more accurately.

In particular, the non-zero angle may be approximately 90°.

In another embodiment, the first image capturing system comprises a first set of cameras, disposed on a first side of the at least one plane.

Cameras can be used to capture images of the illuminated part of the contour. Using image processing it is possible to derive from the captured image the shape of the contour as recorded in the image. Then, using the known geometry of the at least one plane, a two-dimensional shape of the slice can be determined. By disposing the cameras to one side of the plane, the cameras may have view axis that are at a non-zero angle with respect to the at least one plane. Accordingly, a contour of the object along the plane is reflected as a (curved) line segment in images recorded by the cameras. Accordingly, the position of the contour in the image reflects the shape of the contour, so that the image can be used, together with the known geometry of the plane, to determine a two-dimensional representation contour.

Furthermore, the first set of cameras being disposed to one side of the at least one plane may be used to view the object's leading or trailing end as it passes through the at least one plane. In case of a generally spherical object, the leading and trailing ends are referred to as poles. Viewing at least one of the poles may aid in constructing a three-dimensional representation of the complete object.

Throughout this application, cameras being disposed on a side of the at least one plane may mean the cameras are not co-planar with the at least one plane, and are therefore disposed at a distance to the at least one plane.

The first set of cameras may include a single camera. Alternatively the first set of cameras may include multiple cameras.

The first image capturing system may comprise a second set of cameras, disposed on a second side of the at least one plane, the second side being opposite the first side with respect to the at least one plane.

Accordingly, the first set of cameras may be able to capture either the leading or trailing end, whereas the second set of cameras may be able to capture the other of the leading or trailing end, so that both are indeed captured.

Cameras of the first set and of the second set may be used together to register the same illuminated part of a contour. Accordingly, a single line projection system may be sufficient for illuminating the contour captured by the two sets of cameras.

The second set of cameras may include a single camera. Alternatively the second set of cameras may include multiple cameras.

The cameras of the first and/or second set of cameras may have respective view axes that enclose a non-zero angle with the at least one plane. The non-zero angle may be between 10° and 50°, preferably between 15° and 40°, most preferably between 20° and 30°.

The first set and/or the second set of cameras may comprise three or more cameras.

Using three or more cameras in the set may allow capturing a relatively large part or the entirety of the contour of a slice.

Multiple cameras of the image capturing system may be configured to capture images consecutively, for instance by triggering the cameras consecutively. Accordingly, more first images per unit of time can be taken, which improves the temporal resolution of the image capturing system, which may aid in increasing the accuracy of the three-dimensional representation of the object.

An increase in temporal resolution can also be achieved by configuring the cameras of the first set of cameras to capture images consecutively, wherein each camera of the second set of cameras captures images in synchronization with a respective camera of the first set of cameras.

In yet another embodiment of the device according to the invention the cameras of the first set and/or the second set are arranged co-planar with each other respectively. Accordingly, the cameras of the first set may be co-planar with each other, and/or the cameras of the second set may be co-planar with each other. Cameras of the first set and second set may not be co-planar with each other.

The use of multiple cameras requires accounting for the difference in position and orientation of each camera, in order to match features in images taken by different cameras. The process of determining the mutual position and orientation of cameras is part of what in the art is referred to as a calibration process. By placing the cameras of a set co-planar with each other, the calibration process may be facilitated.

A plane defined by the cameras in the first and/or second set of cameras may be substantially parallel to the at least one plane projected by the line projection system. This may further facilitate the calibration process.

In yet another embodiment of the device according to the invention all adjacent cameras within the first and/or second set respectively are substantially equidistant. Accordingly, a distance from one camera to the next is equal for all cameras in the set. This may be achieved by arranging the cameras on a circular path at regular angular intervals. The cameras may be positioned so that the circular path circumnavigates the trajectory, more in particular, so that the circular path has an origin corresponding to the path.

In such an embodiment, the cameras in the set each capture a different part of the object, possibly with some overlap. This aids in capturing images of a relatively large part of the contour of the object.

In yet another embodiment of the device according to the invention, the cameras of the second set are arranged at positions mirroring positions of the cameras of the first set in the at least one plane.

By placing the cameras of the two sets at mirrored positions, the calibration process may be further facilitated. Additionally or alternatively, placing the cameras at the mirrored positions may allow carrying the cameras of the first and second set with a relatively simple frame.

In yet another embodiment of the device according to the invention, the line projection system includes a third set of lasers.

Using lasers, a relatively thin plane may be projected. Accordingly, a relatively thin contour of the object may be illuminated, which may reduce the chances of the first image capturing system capturing parts of the object not part of the same contour. As capturing such parts may constitute a source of noise in the images, using lasers may reduce the level of noise. Additionally or alternatively, the lasers may allow creating a relatively sharp line between illuminated and non-illuminated parts of the object, thereby also possibly reducing the noise.

The term third set for the lasers is herein used only to indicate a set that is different form the previously introduced sets of cameras. The third set of lasers may be employed even without the two sets of cameras. Moreover, there need not be two other sets of lasers.

The third set of lasers may include exactly one laser, two lasers, three lasers, or more lasers. In particular, using three lasers has proved particularly suitable, for it allows to illuminate an object from multiple angles at a relatively low cost.

It may be particularly advantageous to provide a camera in each set for each laser. For instance, in the case of three lasers, each set of cameras may comprise three cameras.

The lasers of the third set may be scanning lasers, i.e. repeatedly moving a beam of light back and forth so as to create an illuminated plane. Alternatively, mirrors, lenses, shaped apertures and/or reflectors may be used to create an illuminated plane.

In yet another embodiment of the device according to the invention, the lasers of the third set are arranged co-planar with each other.

Such an embodiment may be constructible with relative ease, and the lasers being co-planar may further aid in determining the relation defined by the at least one plane.

Arranging the lasers co-planar with each other may further allow to create exactly one illuminated plane. Accordingly, the at least one plane may comprise exactly one plane, and the lasers of the third set may be arranged co-planar with the plane.

In this embodiment, calibration may be facilitated. Moreover, by using one illuminated plane, certain parts of the contour of the object may be illuminated by two lasers, which may allow creating a particularly detailed image of those parts.

In yet another embodiment of the device according to the invention, the third set of lasers comprises three or more lasers. Using at least three lasers may allow illuminating a complete or relatively complete contour of the object.

In yet another embodiment of the device according to the invention, adjacent lasers of the third set are arranged substantially equidistant. Accordingly, a distance from one laser to an adjacent one is constant for all lasers. This may be achieved by arranging the lasers on a circular path at regular angular intervals. The circular path may circumnavigate the trajectory, and may in particular have its origin at the trajectory.

In this embodiment, the lasers may each illuminate a different part of the object. Additionally or alternatively, multiple lasers may overlap in some segments of the contour of the object, which may aid in creating a detailed representation of those segments.

In yet another embodiment of the device according to the invention, the first image capturing system comprises a first image capturer and a second image capturer, and the line projection system comprises a first line projector and a second line projector, wherein the first image capturer is configured to capture images including at least part of a contour illuminated by the first line projector, but not by the second line projector, and the second image capturer is configured to capture images including at least part of a contour illuminated by the second line projector, but not by the first line projector.

Each line projector may produce a separate illuminated plane or a separate part of one illuminated plane, which may thus correspond to different geometry information. In processing a first image, it is therefore necessary to determine whether an illuminated part of a contour is illuminated by the first or second line projector. In this embodiment, said determination may be made simply by tracing the origin of the first image, since each image capturer captures only contours illuminated by a single line projector.

Different solutions may be employed for allowing a particular image capturer to only capture parts of a contour illuminated by a particular line projector.

As a first solution, the first image capturer may be provided with a monochrome filter, whereas its corresponding line projector is configured to project a line of a color that passes the monochrome filter. Any other line projectors may be configured to project light in another color. Accordingly, the first image capturer will capture only the part of the contour illuminated by its corresponding line projector. The second image capturer may be provided with another monochrome filter, which corresponds to the color of its corresponding line projector. Accordingly, the second image capturer captures only the parts of the contour illuminated by the second line projector.

The image capturing system as described above, be it with or without the above-described particulars relating to the first and second image capturers and line projectors, may be outfitted with a monochrome filter corresponding to light produced by the line projection system.

As a result, the illuminated contour in the first images may be made easily detectable, whereas background light and noise are reduced or removed.

As a second solution, the first and second line projectors may be configured to alternatingly project, while the first and second image capturers are configured to capture images only when their respective line projector is projecting.

According to this solution, the image capturers capture images alternatingly. This further aids in increasing the temporal resolution of first images, which may aid in producing a detailed and/or accurate three-dimensional-representation of the object.

The image capturers may be embodied as the cameras introduced hereabove. The line projectors may be embodied as the lasers introduced hereabove.

Multiple image capturers may correspond to the same line projector, for instance, a camera of the first set and a camera of the second set may correspond to a laser of the third set. Accordingly, images may be captured by said two cameras when said laser is projecting. Alternatively, when the monochrome filters are used, said two cameras may comprise monochrome filters both corresponding to the color projected by said laser.

In yet another embodiment of the device according to the invention the processing unit is further configured to determine, using the representation of the object, a value corresponding to the volume and/or length and/or width of the object.

Using the representation, the volume and/or length and/or width may be determined relatively accurately. The information relating to these dimensions, in particular since they are known for an individual object, may be used advantageously.

As an example, knowing the volume of a particular root crop, such as a potato, may be used, together with a weight of the potato to determine its density. The density may play a role in determining the price for the potato, and in determining its suitability for a certain market.

Therefore, the device according to the invention may further comprise a scale for determining a weight of the individual object, configured to provide a third signal, wherein the processing unit is connected to the scale for receiving the third signal. The processing unit may accordingly be configured to determine a density of the object, or to determine a submersed weight of the object.

The submersed weight is herein defined as the difference in weight of the object as compared to an amount of water of the same volume as the object. The submersed weight is of particular interest for root crops, such as potatoes.

As another example, knowing the length of a particular root crop, such as a potato, may be used to determine whether it is suitable to cut fries from, which determines its suitability for the fries market.

In yet another embodiment of the device according to the invention the supplier comprises two conveyor belts, each conveyor belt defining a conveyor surface and a conveying direction, wherein the conveyor belts are arranged alongside each other so that their conveying directions are substantially parallel and so that their conveyor surfaces are at a non zero angle with respect to each other, thereby defining a gutter for conveying and supplying individual objects.

Such a supplier may supply the object completely without a rolling velocity or with a relatively small rolling velocity. The rolling velocity is herein defined as the rotational velocity in a rotation direction around a direction of propagation. The direction of propagation corresponds to a tangent to the trajectory at the position of the object.

The invention also relates to a method of determining a three-dimensional representation of an individual object, the method comprising the steps of:

individually supplying an object, and moving it along a
    trajectory through a predetermined space;
  projecting a line along at least one predetermined plane,
    the at least one plane intersecting the trajectory in said
    space, so that when the object is at a position along the
    trajectory at which at least part of the object intersects
    the at least one plane, a contour of a slice of the object
    co-planar to the at least one plane is at least partly
    illuminated by the line;

repeatedly capturing images of at least part of the illumi-
    nated contour as the object moves through the at least
    one plane;
  for each captured image, determining a two-dimensional
    representation of the slice using geometry information
    relating to the at least one plane; and
  determining, using the representation of each slice, a
    three-dimensional representation of the object.

The method may have the advantages described above in relation to the device according to the invention. The method may be carried out using the device according to the invention. The device for carrying out the method may comprise any of the above-described features, in any suitable combination.

In an embodiment of the method according to the invention, the method further comprises determining, using the representation of the object, a
    value corresponding to the volume and/or length and/or
    width of the object.

In this embodiment the method may offer the advantages described above in relation to determining these dimensions.

Throughout this application, when an element is said to be co-planar, it must be understood that it is co-planar as far as practical, and that small deviations within reasonable tolerances are encompassed by the definition of co-planar. Due to inaccuracies in positioning elements with respect to each other, it may still be necessary to account for deviations from co-planar positions, even if the elements are co-planar as must be understood herein.

The invention will be further elucidated with reference to the attached figures, wherein:

FIGS. 1 and 2 schematically show a perspective view and a side view respectively of an embodiment of a device according to the invention;

FIGS. 3A-3C schematically show how an object may pass through the device of FIGS. 1 and 2;

FIGS. 4A-4B schematically show the mutual positioning of cameras and lasers of the device of FIGS. 1-3C using different views of said device;

In the figures, like elements are referred to using like reference numerals.

Figure 1:
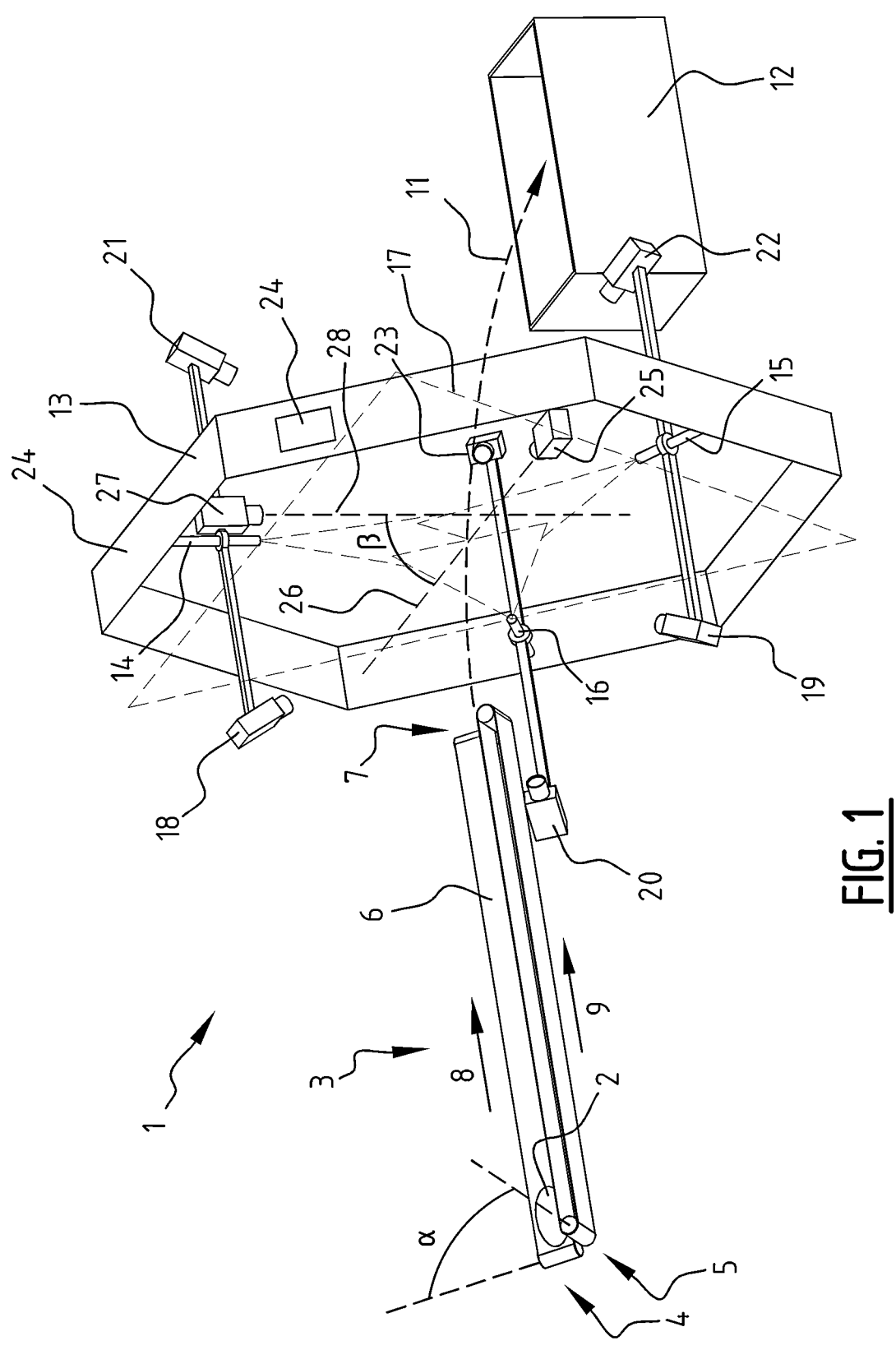
Figure 2:
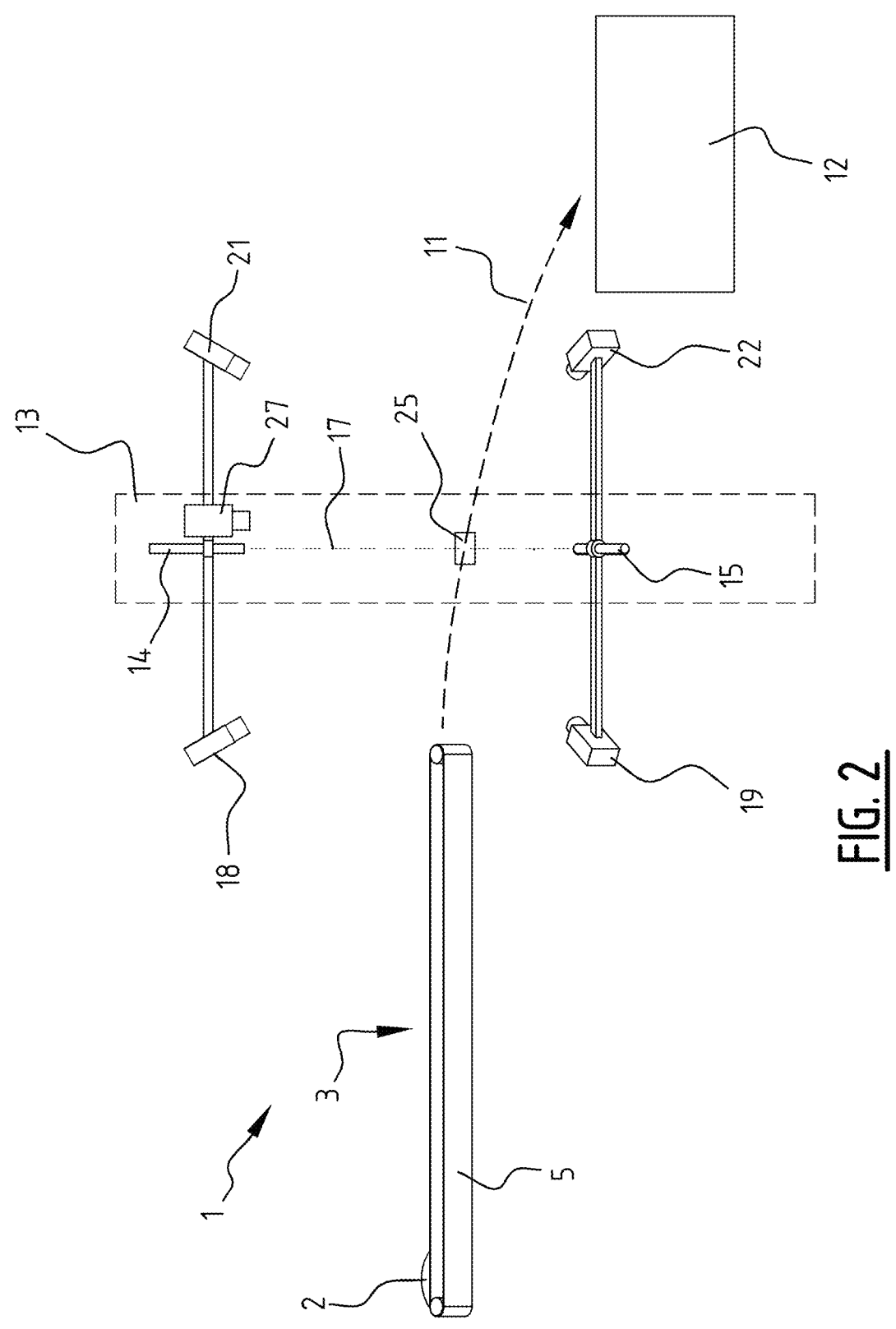

FIGS. 1 and 2 show a device 1 for determining the three-dimensional geometry of an individual object 2. Certain elements of the device 1 are shown more clearly in FIGS. 3A-4B. For the sake of clarity, constructional details have been left out of FIGS. 1 and 2, and FIGS. 3A-4B have been further simplified. The device 1 comprises a supplier 3. In the embodiment shown, the supplier 3 comprises two conveyor belts 4, 5. The belts 4, 5 have a looped configuration, i.e. they are endless. Each belt 4, 5 defines a conveyor surface 6, 7, upon which objects 2 can be placed for conveying. Upon driving the belts 4, 5, objects 2 on the conveyor surfaces 6, 7 are conveyed in a conveying direction 8, 9 of each conveyor belt 4, 5. The conveying directions 8, 9 are parallel to each other. Further, the conveyor surfaces 6, 7 are at a non-zero angle α with respect to each other. The two conveyor belts 4, 5 thus form, along their respecting conveyor surfaces 6, 7, a gutter. Objects 2 can be placed in the gutter for conveyance in the conveying direction 8, 9. Using the supplier 3, objects 2 are individually supplied. At a downstream end 10 of the conveyor belts 4, 5, defined as the end towards their respective conveying directions 8, 9, objects 2 are guided of the conveyor belts 4, 5, so that they continue along a trajectory 11. The trajectory 11 is defined by the velocity of the object 2 when it leaves the conveyor belts 4, 5, and a downwards acceleration caused by gravity. Frictional forces are neglected in the text of this application. After having moved along the trajectory 11, the object ends in a collector 12. The collector 12 is shown here schematically as a box, but may of course be any suitable collector. Alternatively, the objects 2 may be processed further as desired after having moved along the trajectory 11.

The device 1 further includes a frame 13, which in the shown embodiment has a hexagonal cross section. Mounted on the frame 13 is a line projections system and a first image capturing system. The line projection system consists of three separate lasers 14, 15, 16. The lasers 14, 15, 16 each project light along a plane 17. The lasers 14, 15, 16 are arranged co-planar with said plane 17, at equal distances from each other and from the trajectory 11. The plane 17 intersects the trajectory 11. Therefore, when the object 2 moves along the trajectory 11, it moves through the plane 17. Therefore, during the movement of the object 2 along the trajectory 11, the object is at least during a certain time at a position in which at least part of the object 2 intersects the plane 17. At such positions, a slice of the object 2 is co-planar with the plane 17. The contour of that slice is illuminated by light projected from the lasers 14, 15, 16. In the shown embodiment, three lasers 14, 15, 16 make up the line projection system, however, another number of lasers could be used. The use of three lasers 14, 15, 16 however is advantageous, as together the three lasers 14, 15, 16 can effectively illuminate the complete contour of the object 2 as it passes through the plane 17.

Figure 4A:
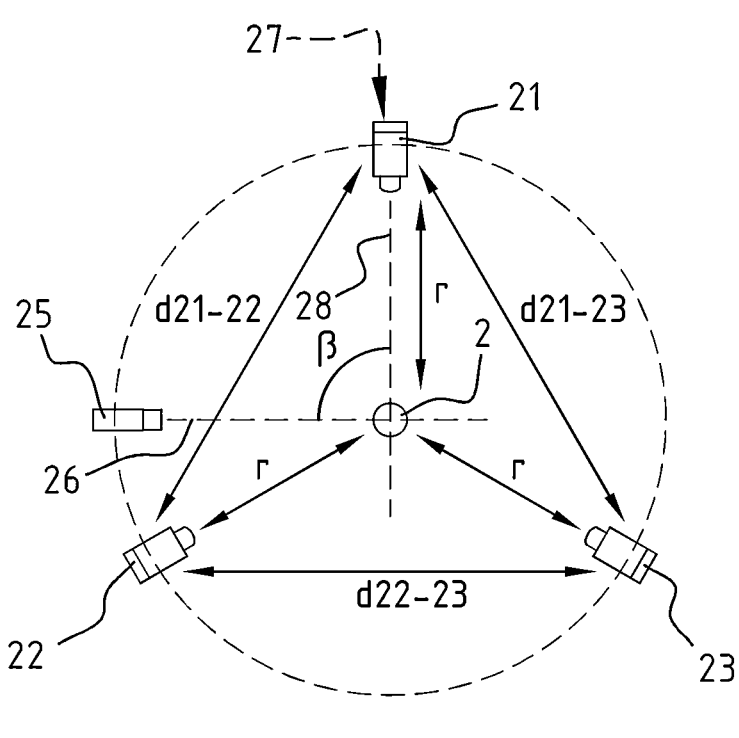
Figure 4B:
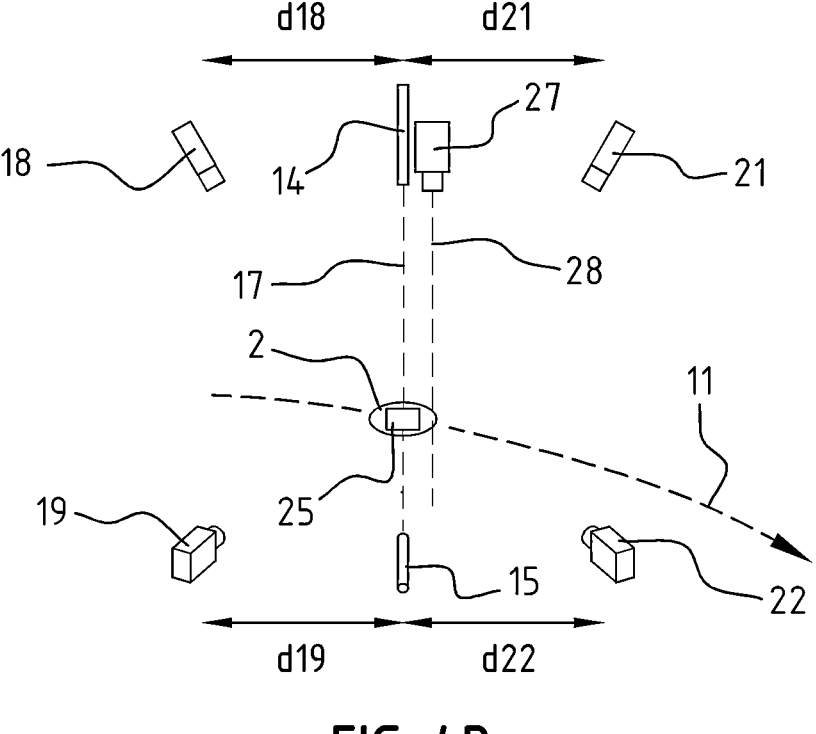

The first image capturing system includes a total of six cameras 18, 19, 20, 21, 22, 23. The cameras 18, 19, 20, 21, 22, 23 are placed into a first set of cameras 18, 19, 20 and a second set of cameras 21, 22, 23. The cameras 18, 19, 20, 21, 22, 23 are all configured to repeatedly capture first images of the object 2 as it moves along the trajectory 11 through the plane 17. Accordingly, the first images show the illuminated contour of the above-identified slice. The cameras 18, 19, 20, 21, 22, 23, and thus the first image capturing system, provide a first signal corresponding to the first images. The first signal serves to make available the image data of the first images. The cameras 18, 19, 20 of the first set are disposed on a first side of the plane 17, towards the supplier 3. Therefore, when the object 2 passes through the plane, its trailing edge can be registered via the cameras 18, 19, 20 in the first set. The cameras 18, 19, 20 are arranged co-planar with each other, at a distance from the plane 17, and have equal mutual distances and equal distances to the trajectory 11. The three cameras 21, 22, 23 of the second set are arranged on the other side of the plane 17, at positions mirroring the positions of the three cameras 17, 18, 19 of the first set with respect to the plane 17. As the object 2 passes through the plane 17, a leading edge of the object 2 can therefore be registered by the cameras 21, 22, 23 of the second set. The mutual position of the cameras 21, 22, 23 of the second set can be seen in FIG. 4A, where mutual distances between the cameras are indicated as d21-22 for the distance between cameras 21 and 22, as d22-23 for the distance between cameras 22 and 23, and d21-23 for the distance between cameras 21 and 23. A radial distance r from each of the cameras 21, 22, 23 to the trajectory 11 along which the object 2 is shown, is substantially equal for all cameras 21, 22, 23 of the second set. As the cameras 21, 22, 23 in the second set mirror the cameras 18, 19, 20 in the first set, the cameras 18, 19, 20 of the first set are arranged at similar positions, mutatis mutandis. The lasers 14, 15, 16 are arranged at similar angular positions as the cameras 18, 19, 20, 21, 22, 23, and also lie on a circular path having a center in the trajectory 11. FIG. 4B shows the mirrored positions of the cameras 18, 19, 20, 21, 22, 23 of the first and second set with respect to each other. As indicated, a distance from each camera 18, 19, 20 of the first set to the plane 17 is substantially equal to the distance to a camera 21, 22, 23 at a corresponding position of the second set. This can be seen for instances by the distance d18 between camera 18 to the plane 17 being equal to the distance d21 between the camera 21 and the plane. Similarly, the respective distance d19, d22 from cameras 19 and 22 to the plane 17 are equal.

The device further includes a processing unit 24, which is here schematically shown as a box mounted on the frame 13, however the processing unit 24 could have any suitable shape and could be placed elsewhere. The processing unit 24 is connected to the first image capturing system for receiving the first signal.

Figure 3A:
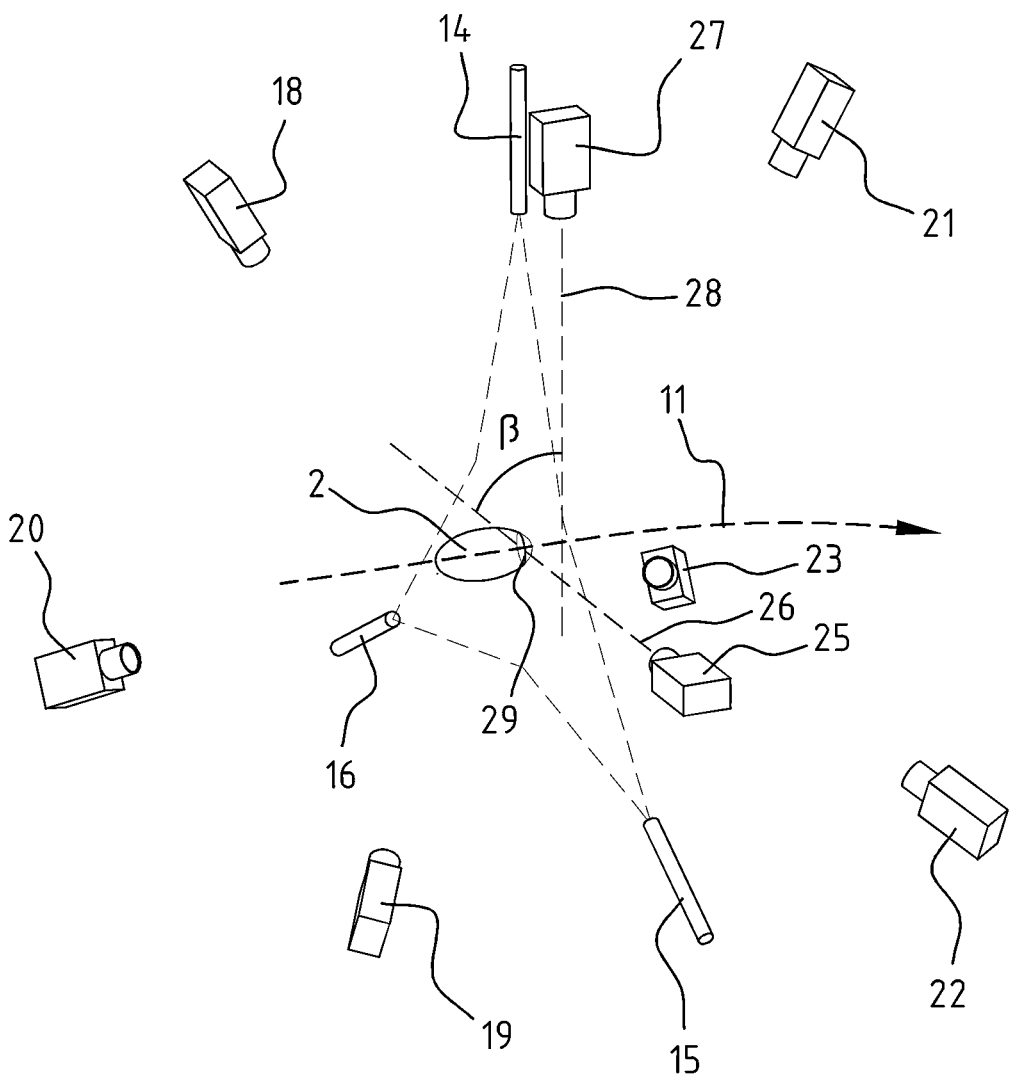
Figure 3B:
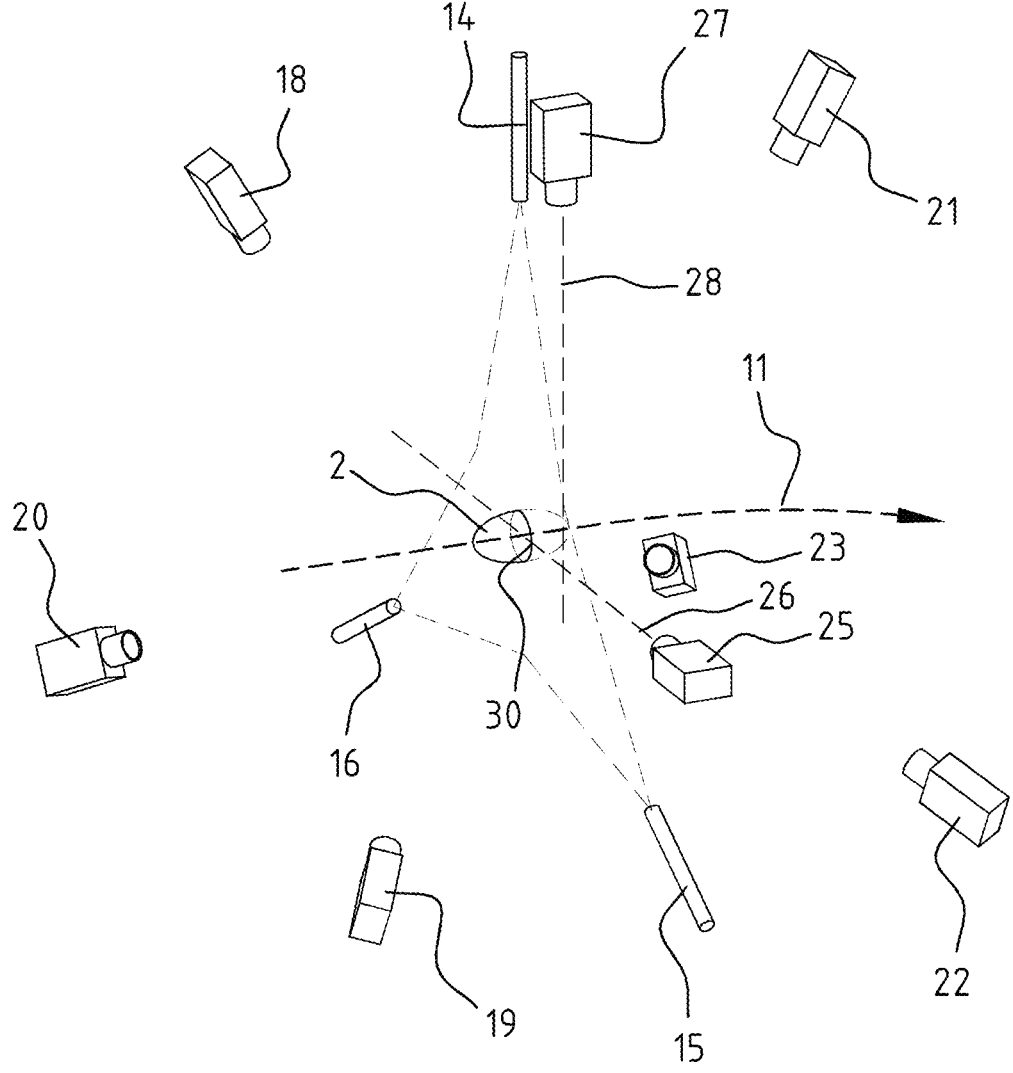
Figure 3C:
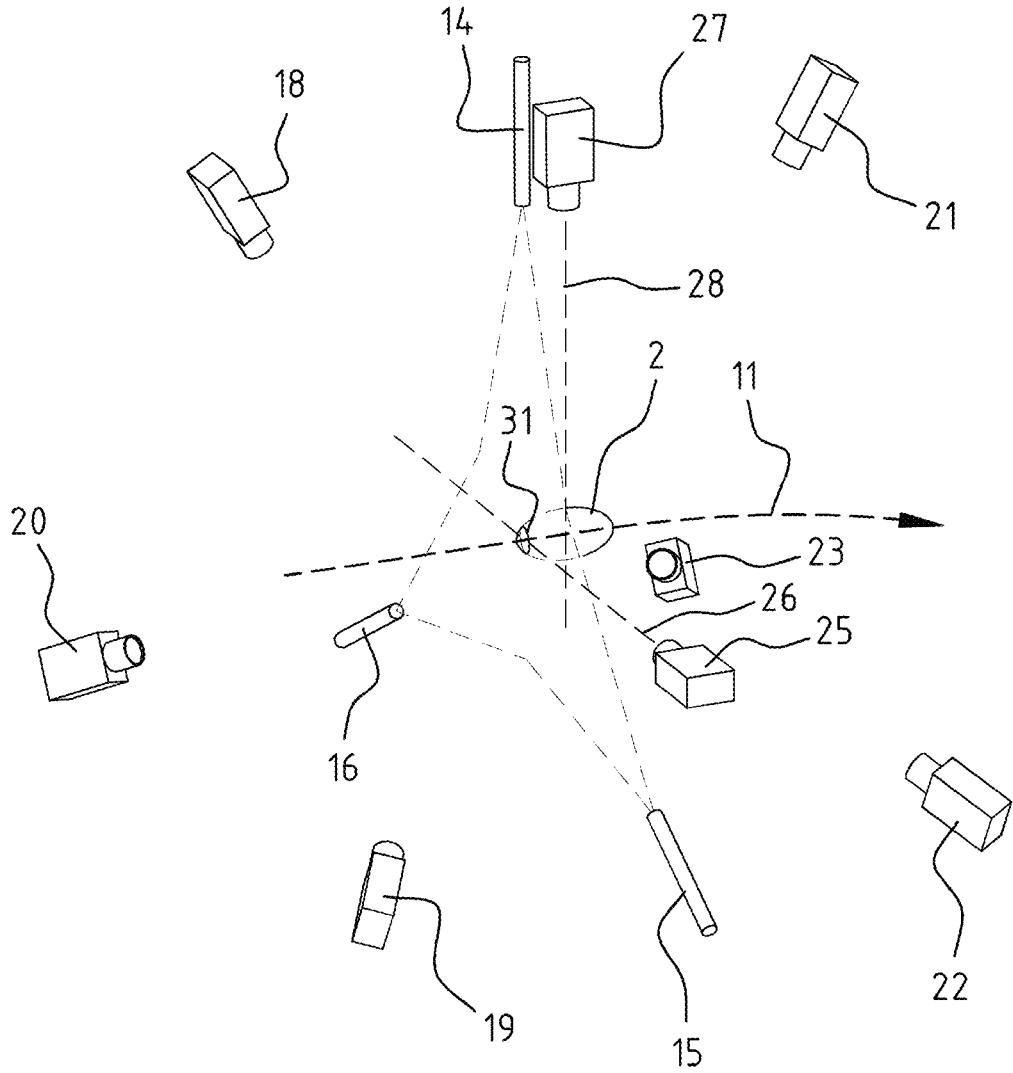

Using the image data of the first images, the processing unit 24 can analyze the images to determine, for each first image, a two-dimensional representation of the slice of which the contour is at least partly illuminated in that image. FIGS. 3A-3C schematically show how different slices of the object 2 can be captured for two-dimensional representation thereof. For reasons of clarity, constructional details have been left out in FIGS. 3A-3C. In FIG. 3A, the object 2 is on a position along the trajectory at which it only just reached the plane 17. The leading edge of the object 2 has passed the plane 17, and the contour of a first slice 29, near the leading edge, is illuminated by the lasers 14, 15, 16. As the object 2 moves further along its trajectory, it reaches a position where half of it has passed the plane 17. As shown in FIG. 3B, the contour of a second slice 30 of the object, is at that position illuminated by the lasers 14, 15, 16. Then, in FIG. 3C the object 2 has moved even further through the plane 17, so that only its trailing edge has not passed the plane 17. The contour of a third slice 31 is then illuminated by the lasers 14, 15, 16. First images may be captured at multiple moments during the time in which the object 2 intersects the plane 17, so that the contour of the object 2 at multiple different slices 29, 30, 31 is captured.

The device 1 shown in FIGS. 1 and 2 further includes a velocity sensor, herein embodied as a first camera 25 for capturing second images repeatedly as the object 2 moves through the plane 2. Accordingly, the velocity sensor is configured for sensing the velocity of the object 2 as it passes through the plane 17, and to provide a second signal accordingly. Using the second images, the instantaneous, i.e. momentary, velocity is determined repeatedly for the specific object 2 passing through the plane 17. As a result, a change in said velocity while the object 2 passes through the plane 17 can be accounted for. The processing unit 24 receives the second signal, and thus has velocity information on the object 2 available. In fact, the velocity is inferred from two second images captured at different times, by determining a change in position along the trajectory 11 of the object 2 between times at which the two second images are captured. Since the first images are taken at the same position relative to the device 1, and the object 2 moves through the plane 17 at a certain velocity with respect to the device 1, first images taken at different moments show different parts of the object 2. The mutual position of the captured parts from one first image to the next is determined by the velocity of the object 2 and the difference between the times at which the one first image and the next were taken. Accordingly, using the instantaneous velocity of the object 2 the processing unit 24 determines a relation between the different parts of the object 2 of which first images were captured at different times. As can been seen best in FIG. 2, the first camera 25 is arranged co-planar with plane 17. A view axis 26 of the first camera 25, facing away from the viewer in FIG. 2, is also co-planar with the plane 17. Further, a second camera 27 is provided, which has its own view axis 28. The second camera 27 is placed above the trajectory 11 near the plane 17, so that the second view axis 28 is near co-planar with the plane 17 and at an angle β of 90° with respect to the first view axis 26. Accordingly, a rotation of the object 2 about two different axes, being the first and second view axes 25, 28, can be registered via the first and second camera 25, 27.

Analysis of the first images works as follows. Geometry information of the plane 17 defines a set of coordinates of points on the plane 17. Where a part of a first image corresponds to an illuminated part of a contour, it can be inferred that this part must have coordinates included in that set, since contours are only illuminated while they are co-planar with the plane 17. Using for example the triggering method explained below in relation to FIG. 7, a first image taken by a certain camera 18, 19, 20, 21, 22, 23 can be uniquely linked to a certain laser 14, 15, 16. Then, using information on the position and orientation of the cameras 18, 19, 20, 21, 22, 23 relative to the plane 17, each part of a first image can be uniquely linked to a coordinate from the set of coordinates corresponding to the plane 17. Obtaining the geometry information on the plane 17 and the position information of the cameras 18, 19, 20, 21, 22, 23 relative to plane 17 is referred to as calibration. Methods of calibration, and calculations needed to uniquely link each part of a first image to coordinates in the set of coordinates are within reach of the person skilled in the art, and are therefore not repeated here. After calibration, the processing unit 24 determines, for each image, coordinates of illuminated parts, which thus correspond to parts of the same contour. These parts of the contour are then reconstructed into a two-dimensional representation of the slice. The two-dimensional representation may be stored as a series of coordinates at which a contour has been detected, in the art referred to as point cloud. Information from multiple first images taken at the same time may be used to determine the two-dimensional representation, by combining the resultant point clouds.

Figure 5:
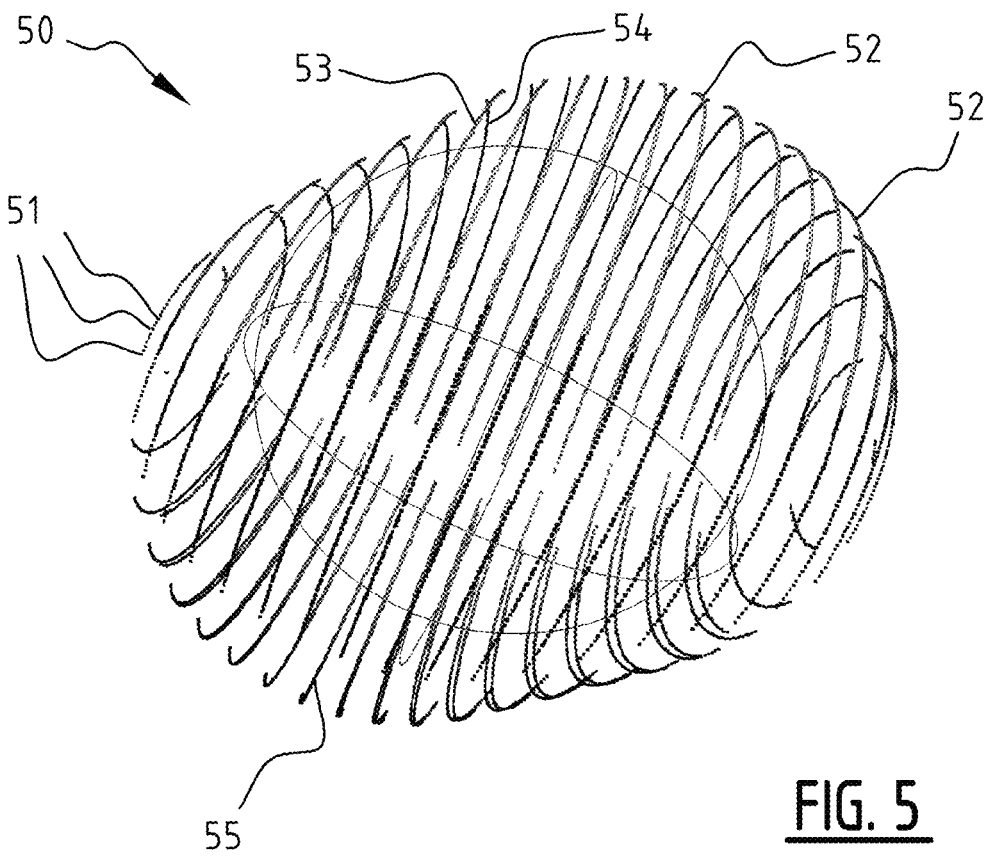
FIG. 5 shows a point cloud indicating contours of slices of an object.

As the object 2 moves through the plane 17, multiple first images are taken. Accordingly, representations of multiple two-dimensional slices are determined. By combining the two-dimensional representations, a three-dimensional representation of the object 2 is then determined. FIG. 5 shows schematically a series 50 of points 51 at which contours have been detected. For reasons of clarity, not all points in the point cloud are shown. In reality, many more points are available. The points are grouped in lines 52 which reflect the contours along which the points have been detected. For reasons of clarity, not each point 51 and line 52 have been provided with a reference sign. As can be seen, for instance at lines 53 and 54, it is not necessary that an entire contour is represented in the point cloud. In fact, lines 53 and 54 are slightly misaligned by virtue of originating from first images taken at different moments in time, and thus representing different slices. By incorporating points taken from more first images, a relatively accurate three-dimensional representation can be determined from the point cloud. Such a three-dimensional representation 60 is shown in FIG. 6.

Figure 6:
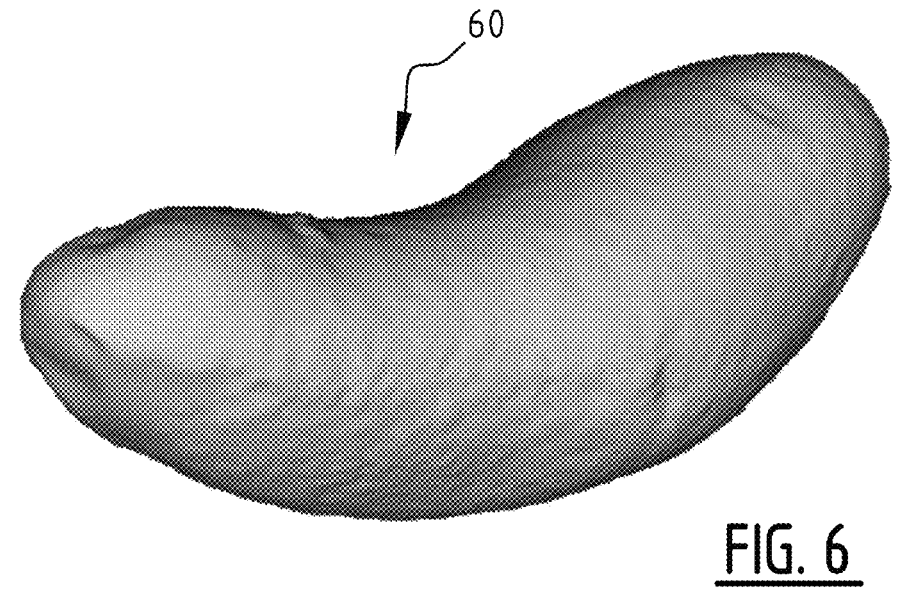
FIG. 6 shows a three-dimensional representation of an object produced by the device of FIGS. 1-4B.

Note that the three-dimensional representation 60 in FIG. 6 is of a different object than the point cloud 50 of FIG. 5. In fact, the three-dimensional representation 60 was obtained by using the device 1 according to the invention on a potato. As can be seen, the result shows with high accuracy and resolution the shape and size of the object 2, so that for instance surface features can be seen.

Figure 7:
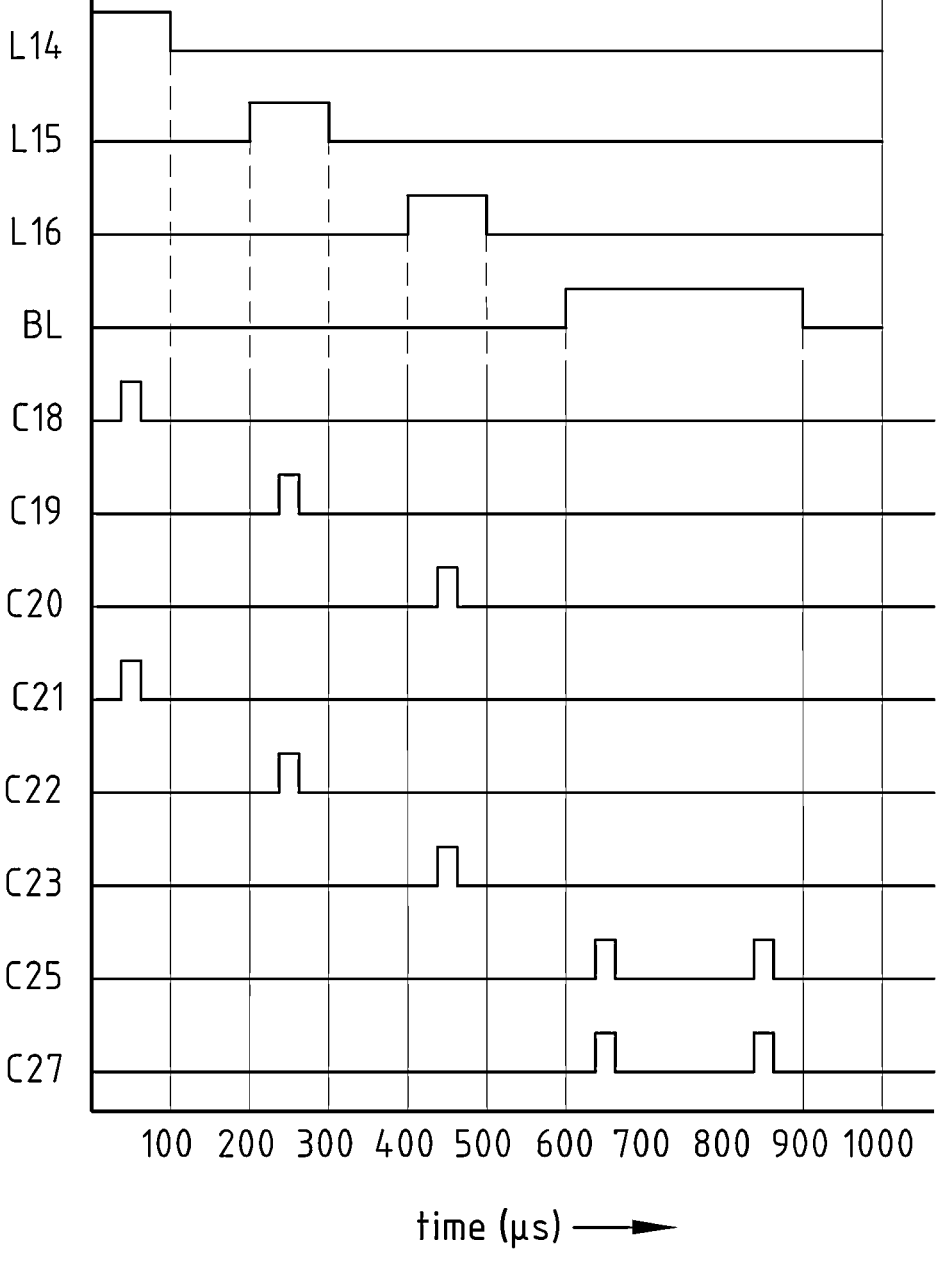
FIG. 7 shows a timing diagram indicating the triggering of certain components of the device of FIGS. 1-4B.

FIG. 7 shows, as a timing diagram, when lasers 14, 15, 16 are active and when cameras 18, 19, 20, 21, 22, 23 are triggered. The diagram shows one cycle that may be repeated. The shown cycle, which is an example, lasts 1000 μs. The diagram includes twelve (12) signals labeled L14-L16, BL, and C18-C23, C25 and C27. The top three signals L14, L15, L16 indicate when the respective lasers 14, 15, 16 are active. A high signal indicates an active laser 14, 15, 16, a low signal indicates an inactive laser 14, 15, 16. Thus, as can be seen, the lasers 14, 15, 16 are active during different time windows, that do not overlap. In the current example, the windows of activity of each laser 14, 15, 16 are separated by intervals in which no laser 14, 15, 16 is active, however no such interval may be necessary. Each window of activity lasts, in this example, 100 μs. As explained above, a pair of cameras 18; 21, 19; 22, 20; 23 is assigned to each respective laser 14, 15, 16. The cameras 18; 21, 19; 22, 20; 23 closest in position and view angle to each respective laser 14, 15, 16 are assigned to that laser 14, 15, 16. The cameras 18, 19, 20, 21, 22, 23 are triggered in the window of activity of their respective laser. Signals C18-C23 indicated with a high signal when a respective camera 18-23 is triggered, and with a low signal when a respective camera 18-23 is not triggered. As can be seen, each pair of cameras 18; 21, 19; 22, 20; 23 is triggered only within the active window of its respective laser 14, 15, 16. Accordingly, a contour shown in a first image taken by a certain camera 18, 19, 20, 21, 22, 23 can be traced back to a certain laser 14, 15, 16. Thus, even if each laser 14, 15, 16 produces a different plane 17, a contour in a first image may still be linked to geometry information related to that plane by tracing its origin from camera 18, 19, 20, 21, 22, 23 to laser 14, 15, 16. FIG. 7 further shows signal BL which indicates high when a backlight is active, and low when it is inactive. When the backlight is active, first and second camera 25, 27 are triggered, in this example multiple times, however once would also be possible, as shown by signals C25 and C27 respectively. Again, a high signal C25, C27 shows when the cameras 25, 27 are triggered, and low signal C25, C27 shows when the cameras 25, 27 are not triggered. Signals 25, 27 show that the cameras 25, 27 are triggered when the backlight is active, so that they can take backlighted second images of the object 2. A similar timing could be chosen for a front light. Alternatively, a front light could be added in the cycle, and could have a window of activity outside any other window of activity. The backlight is active outside the windows of activity of the lasers 14, 15, 16. Therefore, background light from the backlight is not present in the first images taken within said windows of activity of the lasers 14, 15, 16.

Although the invention has been described hereabove with reference to a number of specific examples and embodiments, the invention is not limited thereto. Instead, the invention also covers the subject matter defined by the claims, which now follow.

The invention claimed is:
1. A device for determining the three-dimensional geometry of an individual object, the device comprising:

a conveyor configured to individually supply the object and to move it along a trajectory through a predetermined space;

a line projector configured to project a line along exactly one predetermined plane, wherein the exactly one plane intersects the trajectory in said space, so that when the object is at a position along the trajectory at which at least part of the object intersects the exactly one plane, a contour of a slice of the object co-planar to the exactly one plane is at least partly illuminated by the line;

a first image capturing system configured to repeatedly capture first images in said space as the object moves through the exactly one plane, the first images thereby including at least part of the illuminated contour, and for providing a first signal comprising image data of the first images; and a processing unit connected to the first image capturing system for receiving the first signal, wherein the processing unit is configured to:

determine, for each first image, a two-dimensional representation of the slice based on said first signal and geometry information relating to the exactly one plane; and determine, using the representation of each slice, a three-dimensional representation of the object; wherein the first image capturing system comprises a first set of cameras, disposed on a first side at a distance before the exactly one plane, and wherein the first image capturing system comprises a second set of cameras, disposed on a second side at a distance after the exactly one plane, the second side being opposite the first side with respect to the exactly one plane.

2. The device according to claim 1, further including:

a velocity sensor for sensing a velocity of the object as it passes through the exactly one plane, configured to provide a second signal corresponding to the velocity, wherein the processing unit is connected to the velocity sensor for receiving the second signal, and wherein the processing unit is further configured to:

determine the two-dimensional representation of the slice and/or the three-dimensional representation of the object using the second signal.

3. The device according to claim 2, wherein the velocity sensor comprises:

a second image capturing system for repeatedly capturing second images of the object as it moves through the exactly one plane, and for providing the second signal, the second signal corresponding to the second images, wherein the processing unit is configured to:

determine, using the second signal corresponding to at least two second images, a change in position along the trajectory of the object between times at which the at least two second images were captured; and determine, using the change in position, a value corresponding to the velocity of the object.

4. The device according to claim 3, wherein the second image capturing system comprises a first camera for capturing the second images, the first camera having a first view axis, wherein the first camera is arranged such that:

the first view axis is substantially co-planar with or parallel to the exactly one plane.

5. The device according to claim 4, wherein the second image capturing system comprises a second camera for capturing the second images, the second camera having a second view axis, wherein the second camera is arranged such that:

the second view axis is substantially co-planar with or parallel to the exactly one plane; and the second view axis is at a non-zero angle with respect to the first view axis.

6. The device according to claim 1, wherein the first set and/or the second set comprise three or more cameras.

7. The device according to claim 6, wherein the cameras of the first set and/or the second set are arranged co-planar with each other respectively.

8. The device according to claim 7, wherein all adjacent cameras within the first and/or second respectively set are substantially equidistant.

9. The device according to claim 1, wherein the cameras of the second set are arranged at positions mirroring positions of the cameras of the first set in the exactly one plane.

10. The device according to claim 1, wherein the line projector includes a third set of lasers.

11. The device according to claim 10, wherein the lasers of the third set are arranged co-planar with each other.

12. The device according to claim 11, wherein the lasers of the third set are arranged co-planar with the exactly one plane.

13. The device according to claim 10, wherein the third set of lasers comprises three or more lasers.

14. The device according to claim 13, wherein adjacent lasers of the third set are arranged substantially equidistant.

15. The device according to claim 1, wherein the first image capturing system comprises a first image capturer and a second image capturer, and wherein the line projector comprises a first line projector and a second line projector, wherein the first image capturer is configured to capture images including at least part of a contour illuminated by the first line projector, but not by the second line projector, and the second image capturer is configured to capture images including at least part of a contour illuminated by the second line projector, but not by the first line projector.

16. The device according to claim 1, wherein the processing unit is further configured to:

determine, using the representation of the object, a value corresponding to the volume and/or length and/or width of the object.

17. The device according to claim 1, wherein the conveyor comprises two conveyor belts, each conveyor belt defining a conveyor surface and a conveying direction, wherein the conveyor belts are arranged alongside each other so that their conveying directions are substantially parallel and so that their conveyor surfaces are at a non zero angle with respect to each other, thereby defining a gutter for conveying and supplying individual objects.

18. The device according to claim 1, wherein the cameras of the first and/or second set of cameras have respective view axes that enclose a non-zero angle with the at least one plane, the non-zero angle being between 10° and 50°.

19. The device according to claim 18, wherein the non-zero angle is between 15° and 40°.

20. The device according to claim 19, wherein the non-zero angle is between 20° and 30°.

21. A method of determining a three-dimensional representation of an individual object, the method comprising the steps of:

individually supplying an object, and moving it along a trajectory through a predetermined space;

projecting a line along exactly one predetermined plane, the exactly one plane intersecting the trajectory in said space, so that when the object is at a position along the trajectory at which at least part of the object intersects the exactly one plane, a contour of a slice of the object co-planar to the exactly one plane is at least partly illuminated by the line;

repeatedly capturing images of at least part of the illuminated contour as the object moves through the exactly one plane using sets of cameras on opposing sides at a distance before and after the exactly one plane;

for each captured image, determining a two-dimensional representation of the slice using geometry information relating to the exactly one plane; and determining, using the representation of each slice, a three-dimensional representation of the object;

wherein optionally, the method further comprises:

determining, using the representation of the object, a value corresponding to the volume and/or length and/or width of the object.

* * * * *